United States Patent
Adams et al.

(10) Patent No.: US 10,724,843 B2
(45) Date of Patent: Jul. 28, 2020

(54) WATER REJECTION ON CAPACITIVE DOOR HANDLE

(71) Applicant: ALPS ALPINE CO., LTD., Ota-Ku, Tokyo (JP)

(72) Inventors: Chad Adams, Salt Lake City, UT (US); Alan Stettler, Salt Lake City, UT (US); Paul Vincent, Kaysville, UT (US)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 15/940,460

(22) Filed: Mar. 29, 2018

(65) Prior Publication Data

US 2018/0283843 A1 Oct. 4, 2018

Related U.S. Application Data

(60) Provisional application No. 62/478,514, filed on Mar. 29, 2017.

(51) Int. Cl.
| | | |
|---|---|---|
| *G01B 7/02* | (2006.01) | |
| *G01N 27/22* | (2006.01) | |
| *E05B 85/10* | (2014.01) | |
| *E05B 81/76* | (2014.01) | |
| *E05B 77/34* | (2014.01) | |
| *E05B 17/22* | (2006.01) | |

(52) U.S. Cl.
CPC .............. *G01B 7/023* (2013.01); *E05B 77/34* (2013.01); *E05B 81/77* (2013.01); *E05B 85/10* (2013.01); *G01N 27/223* (2013.01); *G01N 27/226* (2013.01); *E05B 17/22* (2013.01)

(58) Field of Classification Search
CPC ...... E05B 77/34; E05B 81/77; G01R 27/2605
See application file for complete search history.

(56) References Cited

U.S. PATENT DOCUMENTS

| | | | |
|---|---|---|---|
| 6,075,294 A | 6/2000 | Van Den Boom et al. | |
| 6,713,897 B2 * | 3/2004 | Caldwell .............. | H03K 17/962 200/512 |
| 8,059,103 B2 * | 11/2011 | Geaghan ................. | G06F 3/044 345/173 |
| 8,773,146 B1 * | 7/2014 | Hills ...................... | G01N 27/22 324/658 |
| 9,378,603 B2 * | 6/2016 | Seino .................. | G07C 9/00309 |

(Continued)

FOREIGN PATENT DOCUMENTS

WO WO2014140089 A1 9/2014

OTHER PUBLICATIONS

International Search Report; PCT/US2018/025231; dated Jul. 11, 2018.

*Primary Examiner* — Alvaro E Fortich
(74) *Attorney, Agent, or Firm* — IPUSA, PLLC

(57) ABSTRACT

A system and method that provides a proximity sensor disposed within a door handle of a vehicle to enable one or more commands to be transmitted to the vehicle by a user's hand, wherein the door handle is in a harsh outdoor environment such that the door handle may be wet when the proximity sensor is used to detect the touch or presence of a user's hand, and wherein the proximity sensor is able to compensate for the presence of the water and enable reliable operation of the proximity sensor and thereby enable commands to be sent to the vehicle.

11 Claims, 16 Drawing Sheets

(56) References Cited

U.S. PATENT DOCUMENTS

| | | | |
|---|---|---|---|
| 2003/0048036 A1* | 3/2003 | Lemkin | B81B 3/0037 |
| | | | 310/309 |
| 2005/0001633 A1* | 1/2005 | Okushima | H03K 17/962 |
| | | | 324/658 |
| 2005/0068078 A1* | 3/2005 | Steenwyk | E05B 81/76 |
| | | | 327/172 |
| 2009/0033477 A1* | 2/2009 | Illium | B60R 21/0152 |
| | | | 340/436 |
| 2011/0012623 A1* | 1/2011 | Gastel | B60R 19/48 |
| | | | 324/686 |
| 2011/0175671 A1 | 7/2011 | Reynolds | |
| 2011/0298744 A1* | 12/2011 | Souchkov | G06F 3/044 |
| | | | 345/174 |
| 2011/0310052 A1* | 12/2011 | Souchkov | G06F 3/0416 |
| | | | 345/174 |
| 2014/0136024 A1* | 5/2014 | Herthan | B60R 25/2045 |
| | | | 701/2 |
| 2015/0091311 A1* | 4/2015 | Witte | H03K 17/955 |
| | | | 292/336.3 |
| 2016/0117014 A1* | 4/2016 | Davison | H03K 17/962 |
| | | | 345/174 |
| 2016/0139285 A1* | 5/2016 | Tsuji | H03K 17/955 |
| | | | 324/679 |
| 2017/0030119 A1* | 2/2017 | Usui | E05B 81/77 |
| 2017/0122927 A1* | 5/2017 | Koizumi | G01N 33/4833 |
| 2017/0300166 A1* | 10/2017 | Rosenberg | G06F 3/045 |
| 2017/0350169 A1* | 12/2017 | Kubo | E05B 81/77 |
| 2018/0135339 A1* | 5/2018 | Kubo | E05B 81/78 |

\* cited by examiner

WATER REJECTION ON CAPACITIVE DOOR HANDLE

BACKGROUND OF THE INVENTION

Field of the Invention

This invention relates generally to touch and proximity sensors. More specifically, the invention relates to a system and method for providing a touch sensor in a door handle that is able to compensate for water being present on the door handle when a user opens the door by coming into proximity of or making direct contact with a door handle on a vehicle.

Description of Related Art

There are several designs for touch and proximity sensor which may be adapted for use in the present invention. It is useful to examine the underlying technology of the touch sensors to better understand how any capacitance sensitive touchpad can take advantage of the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

Touch and proximity sensors that operate outdoors and are therefore subject to being exposed to harsh environmental conditions may have difficulty operating in the presence of water. For example, water on a touch sensor may be particularly challenging because water and moisture (hereinafter to be referred to collectively as "water") may directly interfere with operation of a mutual capacitance touch and proximity sensor. Interference may present itself in the form of an erratic or intermittently operating touch sensor because the water is detectable.

Possible solutions for water on a touch sensor may include compensating for the presence of the water by trying to ignore signals that are believed to come from it. However, this action may result in one or more fingers also being rejected by the touch sensor.

Accordingly, it would be an advantage over the prior art to provide a touch sensor that could more accurately compensate for the presence of water on a touch sensor and provide less erratic operation. It would be even more advantageous to provide such a touch sensor in the door handle of a vehicle that is subject to a harsh outdoor environment where the door handle will often be wet.

It is to be understood that the following description is only exemplary of the principles of the present invention and should not be viewed as narrowing the claims which follow. It should also be understood that the terms "touchpad", "touch and proximity sensor", "touch sensor" "touchscreen", "touch input device", "touch sensitive device", "proximity sensing capacitive sensor" and "door handle touch sensor" may be used interchangeably throughout this document.

BRIEF SUMMARY OF THE INVENTION

In a first embodiment, the present invention is a system and method that provides a proximity sensor disposed within a door handle of a vehicle to enable one or more commands to be transmitted to the vehicle by a user's hand, wherein the door handle is in a harsh outdoor environment such that the door handle may be wet when the proximity sensor is used to detect the touch or presence of a user's hand, and wherein the proximity sensor is able to compensate for the presence of the water and enable reliable operation of the proximity sensor and thereby enable commands to be sent to the vehicle.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention and should not be viewed as narrowing the claims which follow.

In a first the embodiment of the invention, a printed circuit board (PCB) may be provided as a substrate for the touch sensor. However, it should be understood that other materials may be used for the substrate as long as the materials perform the desired function of providing separate layers of electrodes in a door handle proximity sensor.

The substrate may be disposed inside the door handle. The door handle proximity sensor may operate best if the substrate is disposed in a particular position within the door handle. Thus, the door handle proximity sensor may be disposed so as to not make contact with the door handle, or it may disposed against an inside surface of the door handle. The substrate may also be flexible which enables the substrate to have an arcuate or curvilinear shape so as to bend and better conform to a curved shape of a door handle.

It should be understood that in all embodiments of the invention, the door handle may be made of a material that does not interfere with operation of the door handle proximity sensor.

The physical placement of the substrate of the door handle proximity sensor may also depend on the arrangement of electrodes on the substrate.

Figure 1:
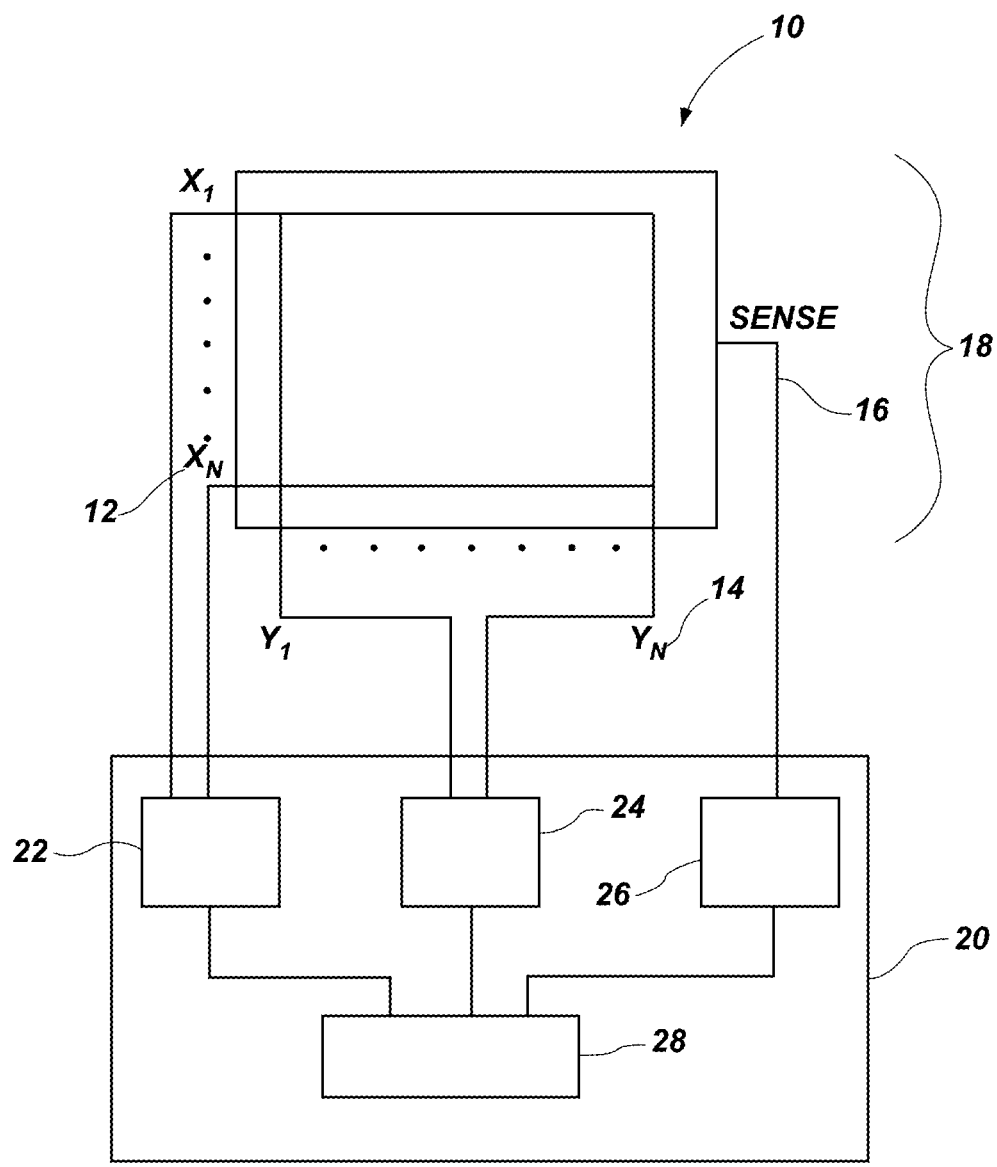
FIG. 1 is a block diagram of operation of a touchpad that is found in the prior art, and which is adaptable for use in the present invention.
Figure 2A:
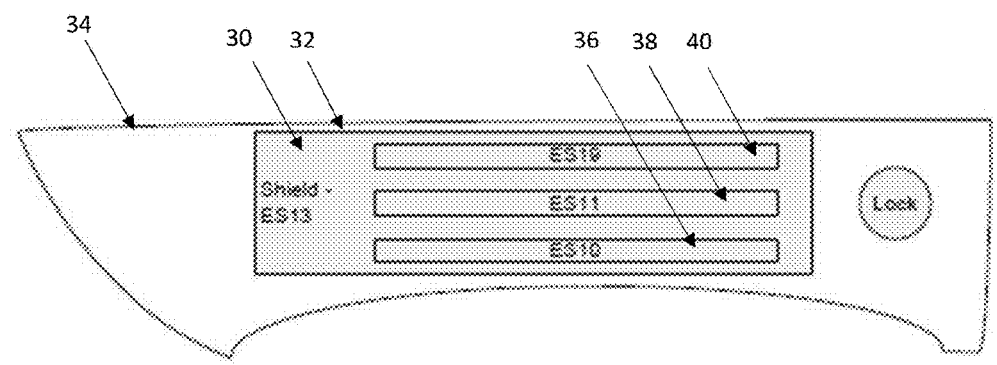
FIG. 2A is a profile view of a door handle and a door handle proximity sensor.

FIG. 2A is a profile view showing an outline of a door handle proximity sensor 30 including a substrate 32 that is inside a door handle 34. The view of the substrate 32 is from the perspective of being between a vehicle and the door handle 34 and looking toward the door handle. A plurality of electrodes 36, 38, 40 may be disposed on a front side of the substrate 32 and a single electrode 42 (shown in FIG. 2B) may be disposed on a back side of the substrate (away from the view in FIG. 2A). The electrodes ES10 (36), ES11 (38) and ES19 (40) are shown on the first side of the substrate 32. On the opposite second side of the substrate 32 is disposed a fourth shield electrode ES13 (42).

The door handle proximity sensor 30 may be capable of detecting a user's body part such as a finger, fingers or hand (hereinafter to be referred to only as a hand) that is moved into a detection range of the door handle proximity sensor. For example, the user's hand may be disposed between the door handle 34 and a door of a vehicle, as if the user is going to pull on the door handle to open the vehicle door. However, the user's hand may also be detected in any location around the door handle 34.

All of the plurality of electrodes 36, 38, 40, 42 may operate as a drive electrode, a sense electrode, in a tri-state condition (electrically floating) or grounded, depending on the needs of the door handle proximity sensor 30. Furthermore, those needs may change when water is detected, and the electrodes may need different signals to distinguish the water from a user's hand.

Figure 2B:
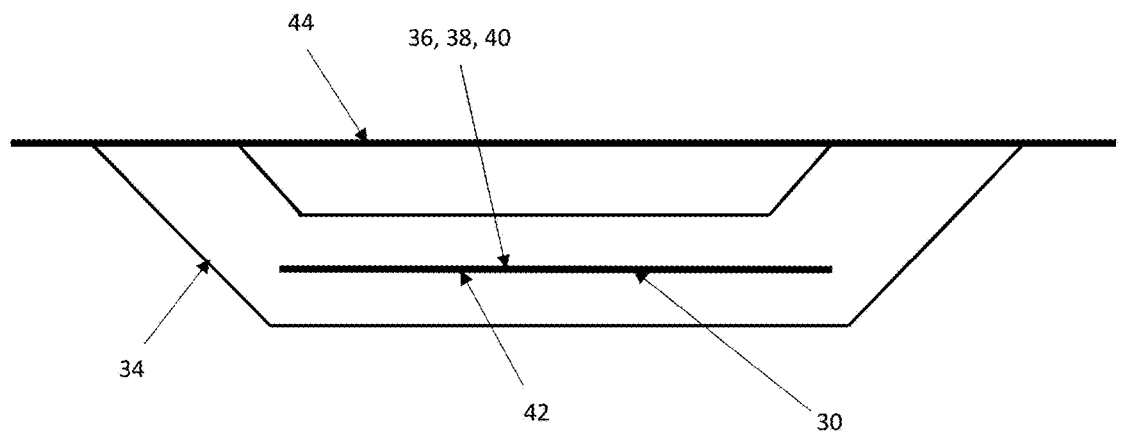
FIG. 2B is a top view of the door handle and the door handle proximity sensor disposed therein.

The view of FIG. 2B is a top view of the elements shown in FIG. 2A, and shows that there is a vehicle door 44, the door handle 34, and the door handle proximity sensor 30 comprised of the substrate 32 and the plurality of electrodes 36, 38, 40 on the first side of the substrate and facing toward the vehicle door 44, and the single shield electrode 42 on the second side of the substrate and facing away from the vehicle door.

The door handle proximity sensor 30 of the first embodiment of the present invention may be a sealed device that is protected from direct contact with environmental elements such as dirt, dust and water. The door handle proximity sensor 30 may also be capable of differentiating between water such as rain, and a user's hand. Furthermore, the door handle proximity sensor 30 may also be capable of differentiating between light rain and heavy rain.

Under typical operation of a touch sensor such as the door handle proximity sensor 30, water and a hand may appear similar, and therefore a touch sensor does not operate reliably. Accordingly, it was determined that the door handle proximity sensor 30 may have to operate with specific signal patterns on the plurality of electrodes 36, 38, 40 and 42. The purpose of the different signal patterns is to take advantage of an object being coupled to ground in contrast to an object not being grounded but instead functioning as a means of coupling to a signal and being a signal carrier between the drive and sense electrodes of the door handle proximity sensor 30. In other words, an object may ground and decrease the signal, or it may amplify the signal between the drive and sense electrodes when it is not grounded.

The first embodiment of the door handle proximity sensor 30 may operate in two different sensing modes of operation. An object may operate in a transmit mode if the capacitive coupling of the object to drive and sense electrodes is greater than the capacitive coupling of the object to ground. In contrast, if the object increases coupling to ground, then the object is operating in a shunt mode and the capacitive coupling between the drive and sense electrodes decreases because capacitance is shunted away.

Figure 3:
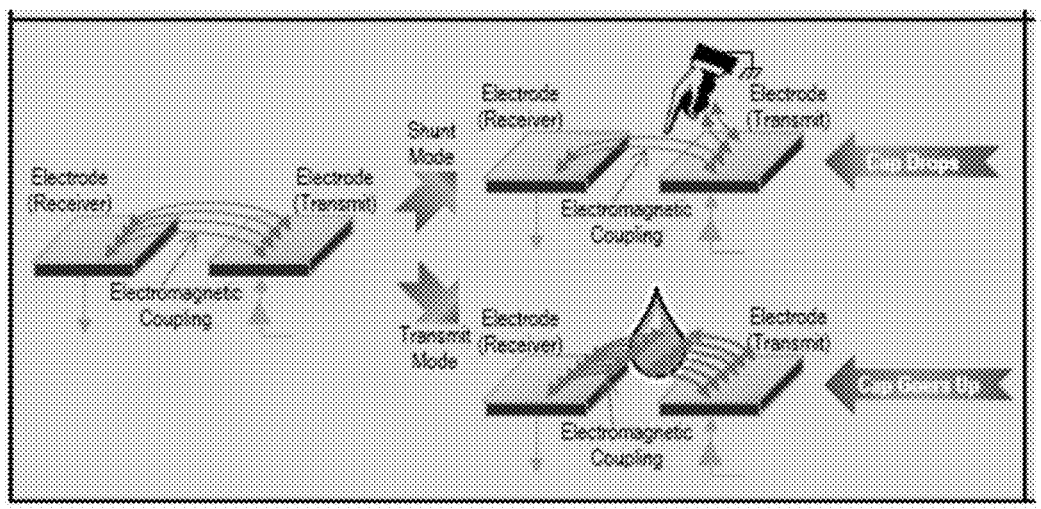
FIG. 3 is an illustration of the concept of a shunt mode and a transmit mode caused by water and a hand in a door handle proximity sensor.

FIG. 3 is an illustration of the concept above. For example, if the object is a drop of water, then the water droplet increases capacitive coupling between the drive and sense electrodes because the water is not grounded. However, if the object is a finger, fingers or the hand of a user (referred to collectively as a "hand" in this document), capacitive coupling decreases because the hand is grounded.

Trying to distinguish between water and a hand was not difficult when water was in the form of water droplets. The water operated in a transmit mode for the door handle proximity sensor when it was water droplets as in a light rain because capacitance increased between the drive and sense electrodes. The door handle proximity sensor was thus able to reject the signal from the water.

However, when the water became a sheet or stream as in a heavy rain, the water may couple to the surface of the door handle that was already well-coupled to the grounded door or the environment. This caused the water to operate in a shunt mode and thus the capacitance between the drive and sense electrodes decreased and operate in a shunt mode, and thus the door handle proximity sensor perceived the water as a hand.

In the first embodiment of the invention this problem is overcome through a combination of signal patterns on the electrodes, and a specific arrangement of the electrodes on the substrate. In this first embodiment, the door handle may also be a conductive material or not. The door handle proximity sensor 30 may still operate as desired.

Beginning with the substrate 32 of the door handle proximity sensor 30, the substrate may have three electrodes ES10 (36), ES11 (38) and ES19 (40) on an inner door handle side of the substrate, while the substrate may have the shield electrode 42 on the outer door handle side of the door handle touch sensor, as shown in FIGS. 2A and 2B.

The problem of distinguishing between a sheet of water and a hand may be accomplished by driving a signal on the outside of the door handle 34 by using the shield electrode E13 (42), and then measuring a resulting signal on the inside of the door handle on the electrode ES11 (38). The assumption may be made that the stream of water running over the door handle will be more coupled to the door handle, and thus the water will operate in the transmit mode shown in FIG. 3. Similarly, when the hand approaches the door handle 34, it is more coupled to the door handle proximity sensor 30 than to the door handle because it is moving to reach the inside of the door handle.

By driving a signal onto the shield electrode ES13 (42) in at least one of the patterns, the door handle proximity sensor is able to identify the water as being water. However, because a variety of patterns are being used, the hand is still able to be detected as a hand using a different drive pattern.

Figure 4:
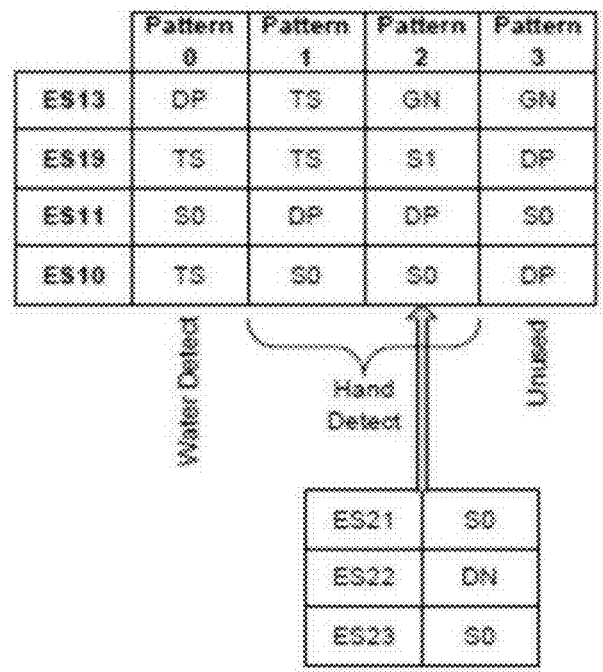
FIG. 4 is a drive signal pattern table that shows which drive signals are used to detect water and a hand using the electrode arrangement of the present invention.

FIG. 4 is provided as a table showing a possible set of patterns that may be used with the hardware of the present invention in order to be able to detect water and to detect a hand.

Accordingly, what is invented is a hardware configuration of electrodes of a proximity sensor in combination with a plurality of drive signal patterns that may be used to detect water and a hand on sense electrodes.

It should also be understood that the door handle proximity sensor of the first embodiment may also include a proximity controller that may be used to generate the drive signals for drive electrode and also receive signals from the sense electrodes and from these signals determine the presence of a hand, of water, a gesture that is being performed, or any other proximity and touch task that is desired.

The instructions that a user may send to the door handle proximity sensor may be any command that may be recognized by a proximity sensor, and may include just the presence of the hand, of water, or it may be more elaborate such as a gesture that is performed by movement of the hand in a detectable manner. Furthermore, the gesture may include touch on the door handle and not just proximity detection.

The command that may be sent to the door handle proximity sensor of the present invention may be to unlock a locked door, lock an unlocked door, lower windows, raise windows, start an engine or any other command that may be desired for a user to send to a vehicle.

The door handle proximity sensor of the first embodiment may also be disposed in locations of a vehicle other than a door handle. The door handle proximity sensor may be disposed anywhere that a user may wish to move a hand and give instructions to the vehicle. For example, the proximity sensor may be disposed in the pillars next to the windshield or any other windows. Thus, any location on the outside of the vehicle may be equipped with the proximity sensor of the first embodiment.

Because the first embodiment of the invention may be used for both hand detection and water detection, applications of the first embodiment may extend to other fields. For example, rain or water detection may be useful for a sprinkler system, and for automatically closing windows. Furthermore, the door handle does not need to be on a vehicle but could also be used for entry into a room or into a building.

It should be understood that the geometry of the electrodes and the layout of the electrodes may be altered and still be within the scope of the invention. Accordingly, the door handle may have various curvilinear surfaces. Likewise, the substrate 32 of the first embodiment may also have a curvilinear shape in order to bend and follow the contours of a handle or other vehicle part in which it is disposed.

In a second embodiment of the invention, some fundamental changes are made to the structure and operation of the door handle proximity sensor. The first embodiment provided some directionality to the operation of the door handle proximity sensor 30 because one side was shielded by the grounded electrode 42. This may have served to amplify detection in one direction, but it also prevented detection on both sides of the door handle proximity sensor.

Figure 5:
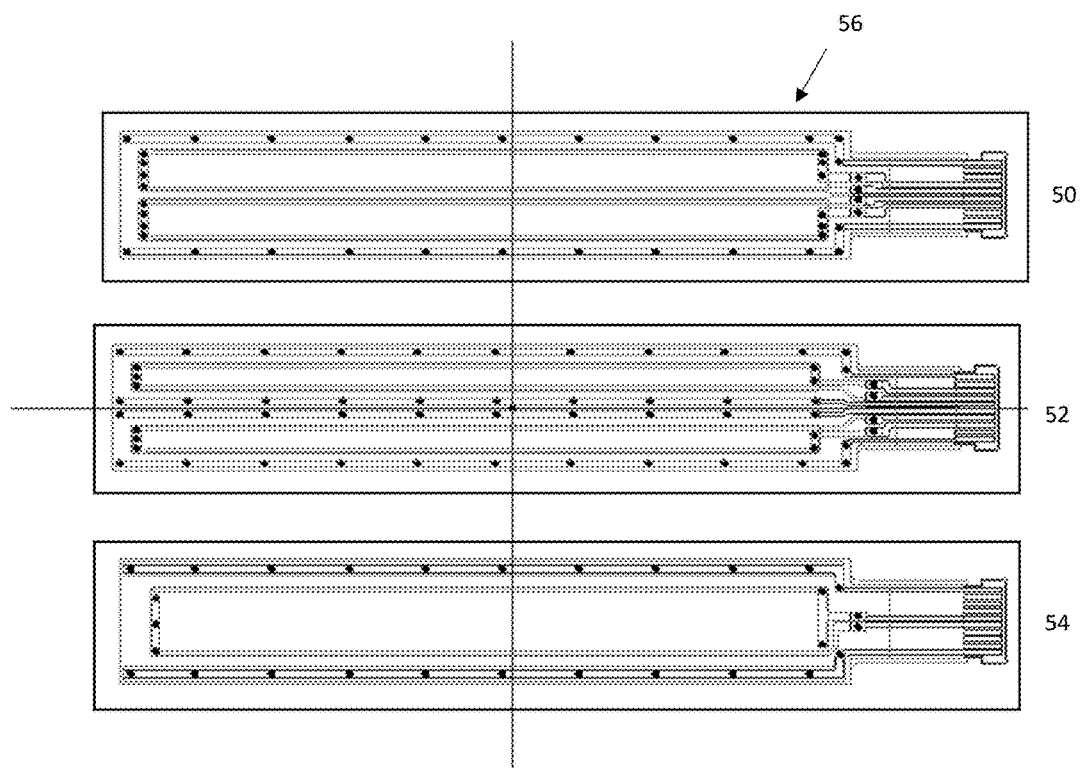
FIG. 5 is a top view of all the layers in a second embodiment of the invention.

Accordingly, the second embodiment of the invention is directed to one of three different door handle proximity sensors shown in FIG. 5. FIG. 5 shows a top view of three different door handle proximity sensor designs 50, 52 and 54 with the layers overlapping each other.

The three different door handle proximity sensor designs 50, 52 and 54 are each comprised of two different layers on a flexible substrate 56 such as MYLAR™ or some similar material that is non-conductive.

Figure 6:
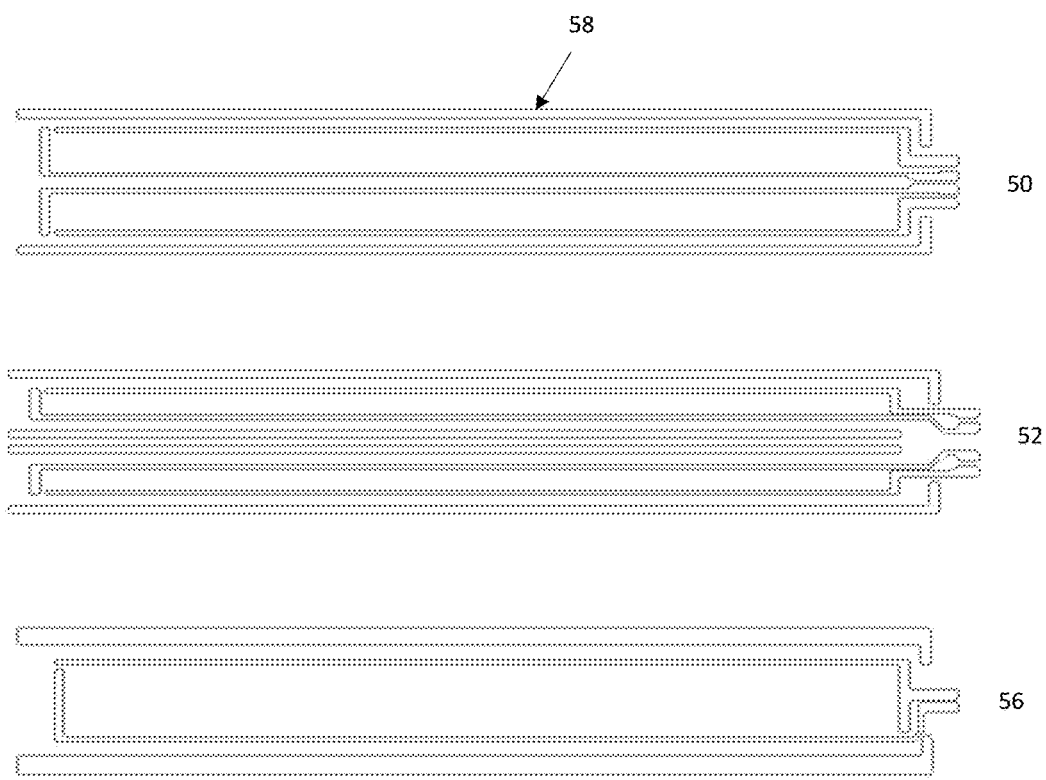
FIG. 6 is a top view of a bottom layer of conductive electrodes in the second embodiment of the invention.

FIG. 6 is a top view of a bottom layer of a plurality of bottom layer electrodes 58 of the door handle proximity sensor designs 50, 52 and 54. These bottom layer electrodes 58 may be comprised of any conductive material such as silver or ITO.

Figure 7:
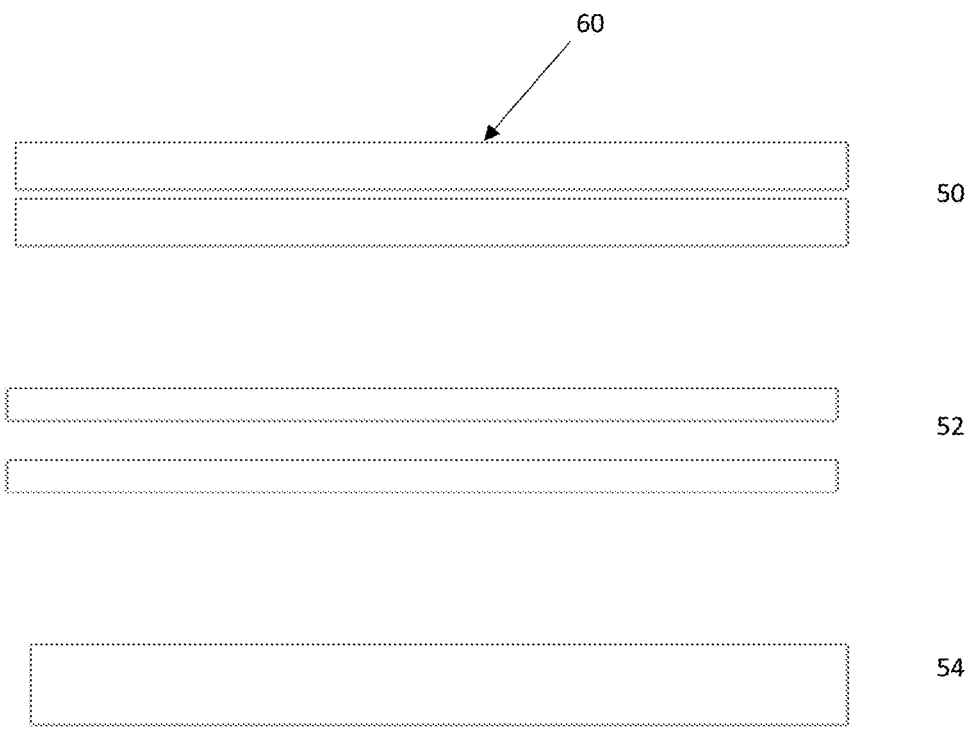
FIG. 7 is a top view of a bottom layer of carbon electrodes in the second embodiment of the invention.

FIG. 7 is a top view that shows that a plurality of bottom layer of the door handle proximity sensor designs 50, 52 and 54 may be comprised of larger carbon electrodes 60 on the door handle proximity sensor designs 50, 52 and 54. While the door handle proximity sensor designs 50, 52 each have two carbon electrodes 60, the door handle proximity sensor design 54 may have a single carbon electrode.

Figure 8:
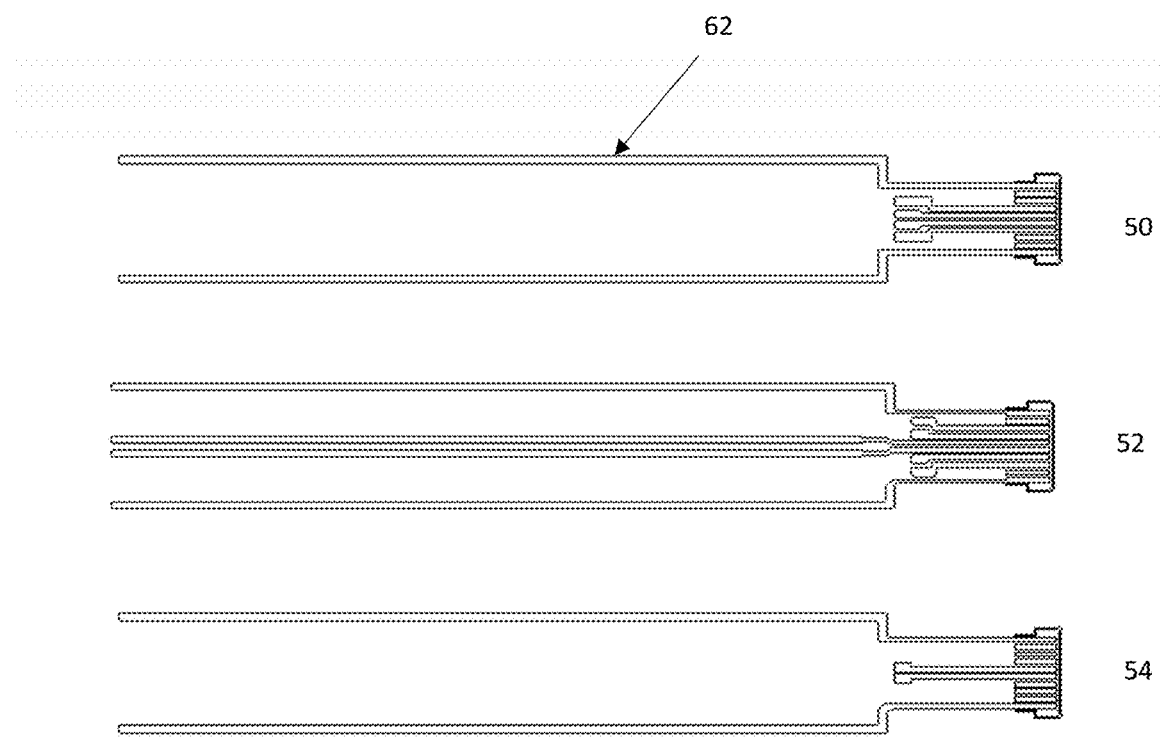
FIG. 8 is a top view of a top layer of conductive electrodes in the second embodiment of the invention.

FIG. 8 is a top view that shows that a plurality of top layer electrodes 62 on the door handle proximity sensor designs 50, 52 and 54 may be comprised of any conductive material such as silver or ITO.

Figure 9:
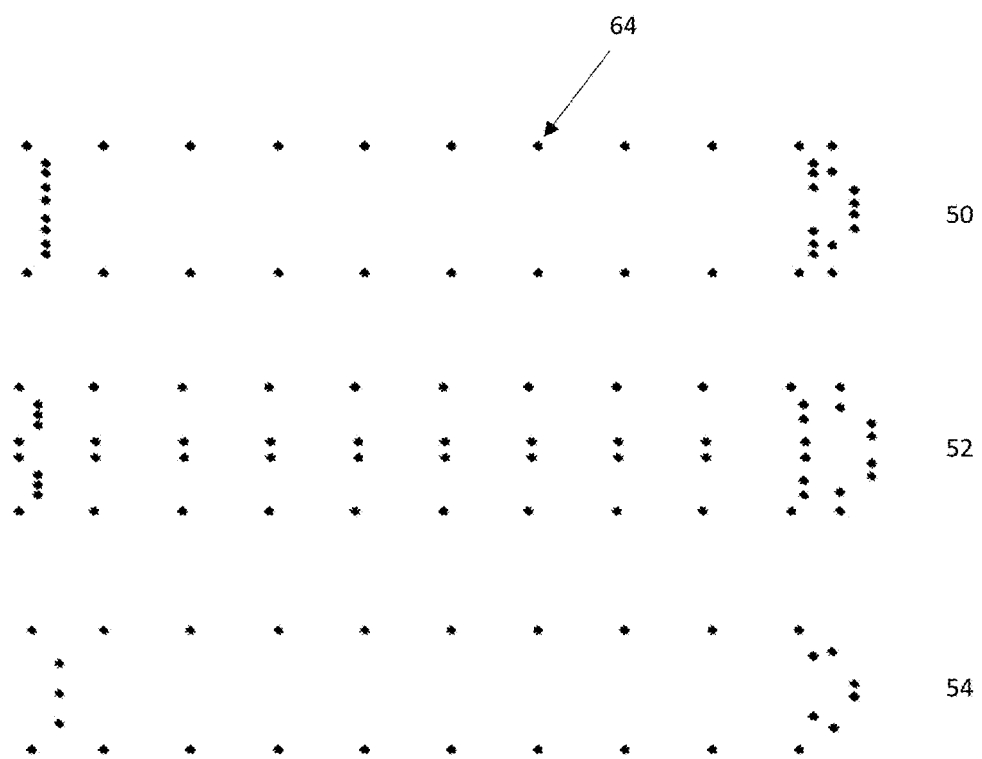
FIG. 9 is a top view of through-holes between the top and bottom layers in the second embodiment.

FIG. 9 is a top view of a through-hole layer showing through-holes 64 in the door handle proximity sensor designs 50, 52 and 54. The through-hole layer enables electrodes to pass between the top layer and the bottom layer.

Some of the important differences between the first and second embodiment include the following. First, the second embodiment is able to provide sensing on either side of the substrate because there is no longer a shield electrode. Shielding may now be provided by the top layer electrodes 62 that are disposed around each of the carbon electrodes 60. In addition, shielding may be in the form of grounding the top layer electrodes 62 or they may be toggled in phase.

Another difference is that the second embodiment of the invention may be less costly to manufacture because all of the different electrodes may be disposed on a single side of the substrate 56, in contrast to the two sides of the substrate of the first embodiment.

Another difference is that the second embodiment may make a single measurement in order to determine if the object being detected is water or a hand. The carbon electrodes 60 may function as sense electrodes. Thus, the bottom layer electrodes 58 may function as the drive electrodes. For the single measurement, the bottom layer electrodes 58 may be driven positive. A detected object will either be grounded (a hand), or floating (water). The floating object may drive the signal on the carbon electrodes more positive, whereas the grounded object may have the opposite effect and drive the signal down.

A proximity controller circuit may be connected to all of the electrodes 58, 60 and 62 of the second embodiment. In the second embodiment, a signal may be taken from both ends of each carbon electrode 60 or it may be taken from a single end. If no position information is needed, then the signal only needs to be taken from a single end. Taking the signal from both ends may be used to derive position information of the detected object.

The second embodiment may operate in a self-capacitance mode of operation, in a mutual capacitance mode of operation, or both but not at the same time. In a mutual capacitance mode of operation, the door handle proximity sensor designs 50, 52 and 54 may be used to distinguish a detected object as a hand or water but may not be used to determine position of the detected object. In contrast, when operating in the self-capacitance mode of operation, the door handle proximity sensor designs 50, 52 and 54 may detect position of the object, but not determine if it is a hand or water. Thus, both modes of operation may be needed if both water detection and position detection are needed. However, if the system only needs to know if the object is water or the hand, then the mutual capacitance mode of operation may be sufficient.

It is noted that most capacitive sensing systems operate in a voltage domain. However, because the proximity controller of the system may be operating in the current or charge domain, the first and second embodiments are able to determine position. If the embodiment operated in the voltage domain, the system could not determine position because the voltage level is held constant. However, because the first and second embodiments may be trying to maintain a voltage by injecting charge when a charge imbalance is detected, and that charge is being measured, by integrating the charge the position may be determined.

It is noted that a hand will cause a drain of current from the carbon electrodes 60 and act as a current divider. The location of the hand would thus be the low resistance end of the carbon electrodes 60. As charge is injected to restore the voltage and balance the circuit in the proximity controller, the location of the hand may be determined by knowing which end of the carbon electrodes was losing current.

It should be understood that the carbon electrodes may be thought of as a single resistive electrode that has a voltage gradient along the length thereof. However, because the door handle proximity sensor designs 50, 52 each have two carbon electrodes 60, these two door handle proximity sensors may also perform hand detection in two dimensions as opposed to the door handle proximity sensor 54 which may only operate in a single dimension.

Another feature of the second embodiment is that when performing a mutual capacitance measurement using the door handle proximity sensor designs 50, 52, 54, when rain affects the electrodes 58, 60, the rain is well balanced and therefore causes a smaller effect on the door handle proximity sensor designs 50, 52, 54. In contrast, a grounded object will have a greater effect and cause a decrease in capacitance. Because the water will always increase the signal between the electrodes 58, 60, it does not matter if the water is light or heavy, the effect may be the same.

Another way to see the second embodiment is that the effect of a floating object may change, but the effect of a grounded object may not.

Another feature of the second embodiment is that a hand may be detected approaching a door handle from either side.

Another feature of the second embodiment is that the larger carbon electrodes 60 provide more capacitive coupling to a hand and thus provide a bigger signal.

In summary, the second embodiment is a system for providing a door handle proximity sensor that includes water protection, wherein the system is comprised of a door handle proximity sensor that is comprised of a proximity sensor substrate having an electrode side, a first layer comprised of two different electrodes, the first electrode being at least one bottom layer electrode for providing a drive signal, and the second electrode being at least one carbon electrode and not in contact with the at least one bottom layer electrode, a non-conductive coating over the first layer, a second layer comprised of a third electrode being at least one top layer electrode disposed on the non-conductive coating, wherein the first layer and the second layer are parallel and coplanar on the proximity sensor substrate, a proximity controller for generating drive signals that are transmitted to the first electrode and for receiving signals from the second electrode that functions as a sense electrode, and for generating a ground or a positive signal on the third electrode, and a door handle that functions as a housing for the door handle proximity sensor. The first electrode may function as a drive electrode, the second electrode may function as a sense electrode, and the third electrode may function as a shield and water electrode.

The first embodiment is directed toward a door handle proximity sensor. The second embodiment is also directed toward a door handle proximity sensor. However, in a third embodiment of the invention, a touch sensor may be disposed on a door handle. For example, the touch sensor may be disposed on the inside of the door handle that is facing the door of the vehicle. A sealed touch sensor may be used that does not rely on a change in capacitance caused by the presence of water or a hand, but by pressure that is placed on a touch sensor as described below.

Figure 10:
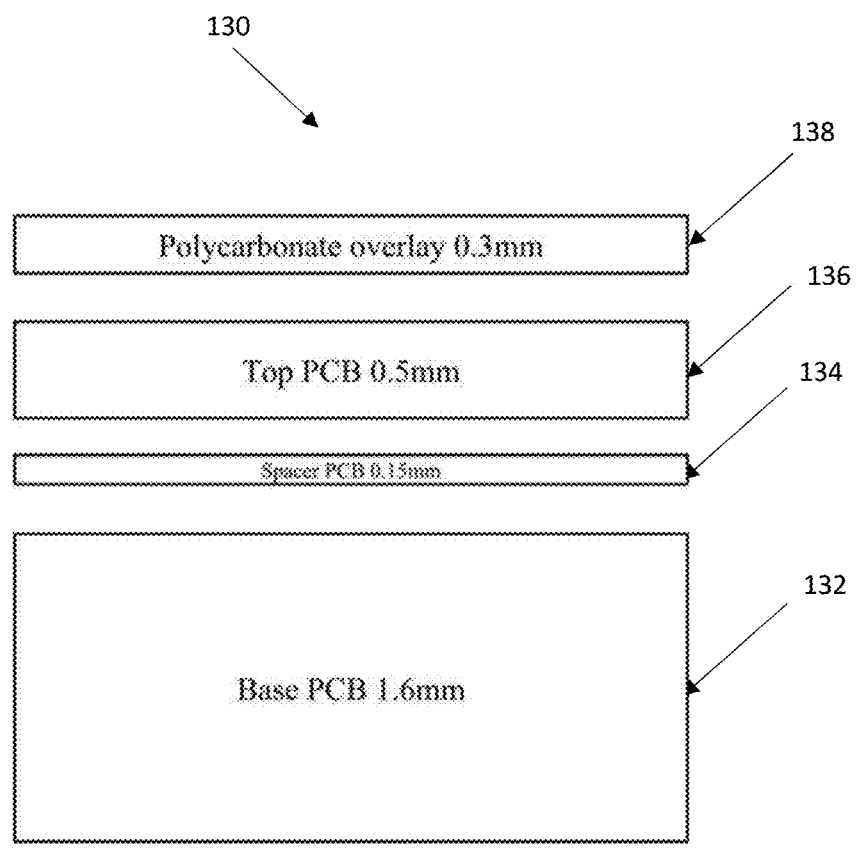
FIG. 10 is a profile view of the layers in a first embodiment of the invention.

FIG. 10 shows a profile view of a stack arrangement for a first embodiment of a door handle touch sensor 130. This door handle touch sensor 130. The stack may include a base layer 132 comprised of a base PCB substrate, a thin spacer board layer 134, a top layer 136 comprised of a top PCB substrate, and an overlay 138. All of the layers in the stack may be planar and parallel to each other.

It should be understood that any suitable substrate material may be substituted for the PCB material of the base layer 132 and the top layer 136, and therefore the embodiments of the invention should not be considered as limited to PCB as the substrate material.

Figure 11:
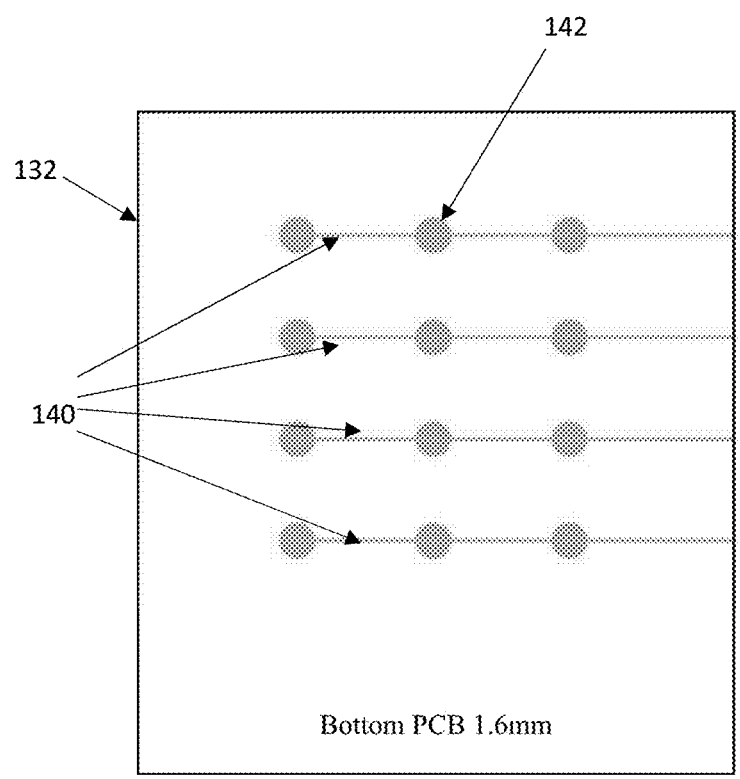
FIG. 11 is a top view of a base PCB layer in the first embodiment of the invention.

FIG. 11 is a top view of the base layer 132. Disposed on the base layer 132 are a plurality of conductive traces that form sense electrodes 140 of the door handle touch sensor 130. The electrodes may function as sense electrodes and are shown in a parallel arrangement. However, the sense electrodes 140 do not have to be parallel, and this arrangement is for convenience only. For example, in a door handle, there may only be the need for a single sense electrode. Accordingly, the sense electrodes 140 may be disposed in other arrangements as long as they do not cross each other.

The door handle touch sensor 130 may not require a complete XY electrode grid of a typical touch sensor capable of tracking movement of a finger. This is because all that is needed is the detection of a voltage and thus a change of capacitance within a specific area forming a switch of the door handle touch sensor 130. Pressing on the overlay 138 will provide the indication that contact is being made with the door handle touch sensor 130.

The thickness of the base layer 32 may typically be 1.6 mm thick but may be any thickness that provides the desired function.

Figure 16:
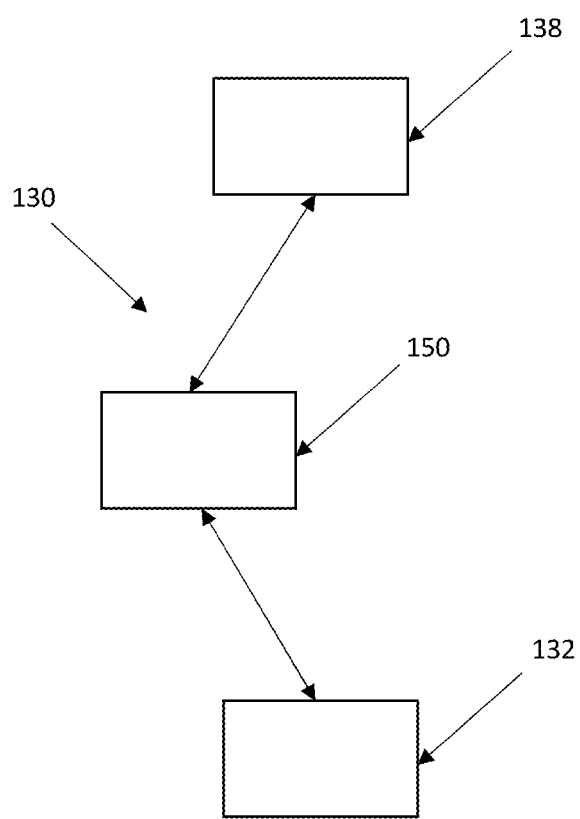
FIG. 16 is a schematic block diagram of a touch sensor controller that is coupled to a base layer and the top layer.

FIG. 16 also shows a plurality of dots 42 made from the conductive material used for the sense electrodes 140. These dots 142 are part of each switch for the door handle touch sensor 130 and are helpful in detecting a change in capacitance when a finger presses on the overlay 138. However, the dots are not required but are for convenience of the embodiments only in order to increase capacitive coupling between the plurality of sense electrodes 140 and the plurality of drive electrodes 146.

In this third embodiment, the plurality of sense electrodes 140 may be disposed in a single horizontal arrangement. However, it should be understood that the plurality of sense electrodes 140 may also be disposed in a vertical arrangement such as on a window pillar of a vehicle and still function as desired. One electrode 140 is required for each row of switches in the door handle touch sensor 130.

Figure 12:
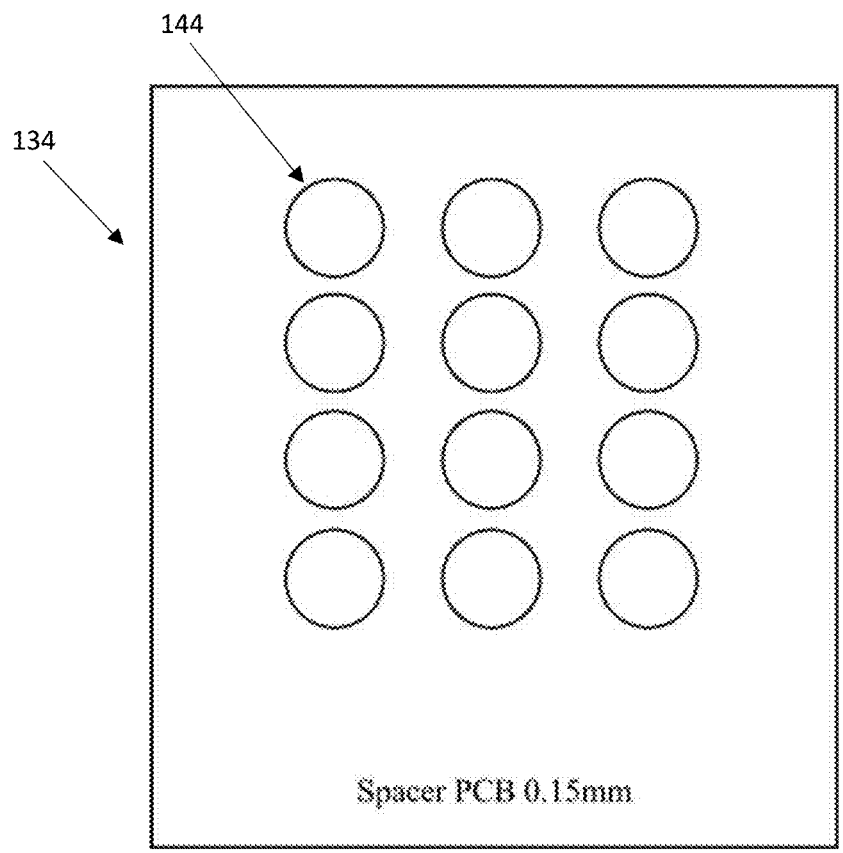
FIG. 12 is a top view of a spacer layer in the first embodiment of the invention.

FIG. 12 is a top view of the thin spacer board layer 134. The thin spacer board layer 134 includes a plurality of apertures 144 through the material forming the thin spacer board layer. The apertures 144 are formed over each of the plurality of dots 142 that form a switch on the base layer 32.

The diameter of each of the plurality of apertures 144 is whatever is necessary such that a substrate may be at least slightly deflected down into an aperture when a user presses on a substrate over an aperture.

The thin spacer board layer 134 may be mounted directly on the base layer 132. The thin spacer board layer 134 may be comprised of a dielectric material such as a PCB or a polycarbonate film. In addition, the thickness of the thin spacer board layer 134 may be any thickness that gives separation between the base layer 132 and the top layer 136 but which will allow the deflection of a layer above.

The thickness of the thin spacer board layer 134 may typically be 0.15 mm thick but may be any thickness that provides the desired function.

Criteria for determining thickness include that the thin spacer board layer 134 must be thin enough such that a small deflection in the top layer 136 creates an adequate change in capacitance in the sense electrodes 140 of the base layer 132 such that a touch sensing circuit may detect the capacitive change.

Figure 13:
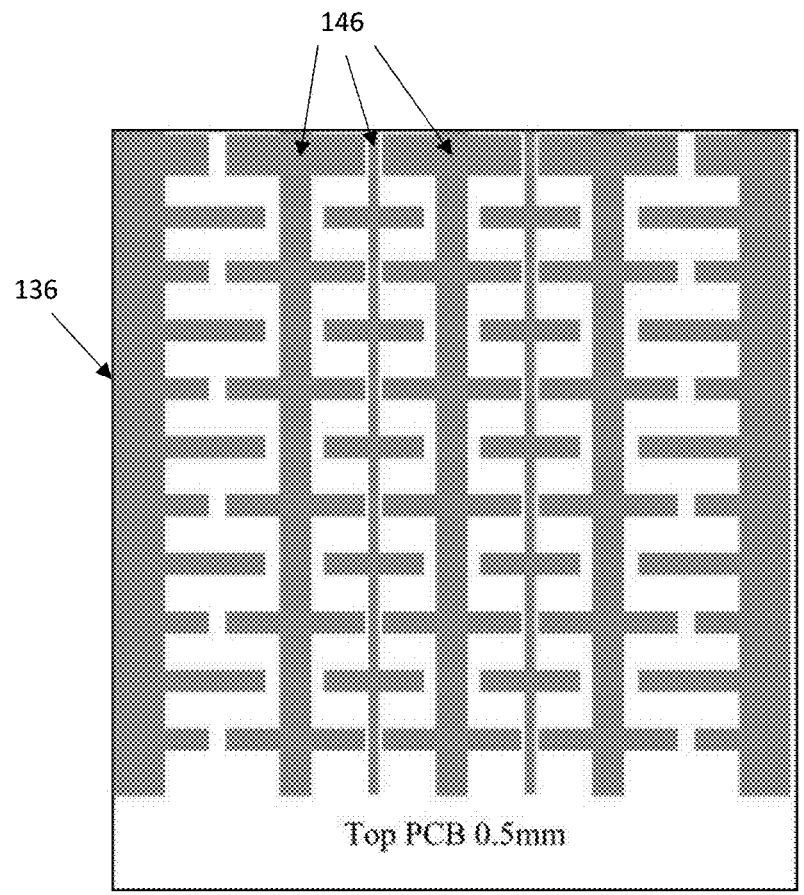
FIG. 13 is a top view of a top layer in the first embodiment of the invention.

FIG. 13 is a top view of the planar top layer 136. The top layer 136 includes a plurality of electrodes 146 that are disposed in a vertical arrangement that may be co-planar with but perpendicular to the plurality of sense electrodes 140. The top layer 136 may be mounted on the thin spacer board layer 134. These vertical electrodes 46 may be driven with a voltage such that the plurality of electrodes 140 that function as switches on the base layer 132 may sense the voltage and thus a change in capacitance on the plurality of electrodes 140.

The top layer 136 may be mounted on the thin spacer board layer 134. These vertical drive electrodes 146 may be driven with a voltage such that the plurality of sense electrodes 140 that together function as switches on the door handle touch sensor 130 may sense the voltage and thus a change in capacitance on the plurality of sense electrodes 140.

The thickness of the top layer 136 may typically be 0.5 mm thick but may be any thickness that provides the desired function of deflection when pressed.

The principle of operation of the third embodiment may be different from capacitive touch sensors of the prior art for several reasons. First, a prior art capacitive touch sensor may be detecting a change in capacitance on electrodes because a user's finger may cause a change in capacitance between two electrodes and may operate using touch alone. The finger may either cause an increase in capacitance due to the presence of a finger when using a self-capacitance touch sensor circuit, or the finger may cause a decrease in capacitance due to the presence of the finger in a mutual capacitance touch sensor circuit.

One aspect of the embodiments that is different from the prior art of touch sensors is that a finger touching the overlay 138 of the door handle touch sensor 130 does not directly affect capacitance of the plurality of sense electrodes 140 so touch alone will not be sufficient to actuate a switch. Instead, the finger is pressing against the top layer 136 causing a slight deflection of this layer. This slight deflection causes the top layer 136 to move closer to the base layer 132 at an intersection of one of the plurality of drive electrodes 146 and one of the plurality of sense electrodes 140. The deflection of the top layer 136 is into one of the plurality of apertures 144 in the spacer board layer 134. A change in capacitance occurs at this intersection. This change in capacitance is detectable by a touch sensor controller 150 to be described.

There is more than one way for a detectable change in capacitance to be created in the door handle touch sensor 130. For example, a touch sensor controller may transmit a signal to the top PBC layer 136 along each of the drive electrodes 146 in a sequential manner by sending a drive signal from a touch sensor controller.

Alternatively, the voltage on the drive electrodes 146 may be held constant, and the sense electrodes 140 may be sampled sequentially in order to determine the location of the deflection.

It should also be understood that the drive electrodes 146 may be allowed to electrically float, be grounded, or be held in a charged state, depending on the circumstances such as the type of touch sensor controller being used, where the system is being used and if other strong signals may be present that must be shielded from the sense electrodes 140 of the base layer 132.

What is important is that the finger is not directly causing the change in capacitance, but instead it is the deflection of the top layer 136. The advantages of this system and method are several. First, the system is still sealed to any outside contamination because at least the base layer 132, the thin spacer board layer 134 and the top layer 136 may be sealed to each other in a stacked arrangement and thereby sealing out any water or debris that might try to get between the layers 132, 134, 136. Second, because the finger does not cause the change in capacitance, any object may press on the top layer 136 and cause the change in capacitance. Thus, a user wearing a glove in cold weather does not need to remove it in order to operate the system. Third, the top layer 136 may function as a shield to strong signals that might otherwise cause a change in capacitance on the sense electrodes 1140 of the base layer 32.

The first embodiment of the invention has been directed to a system where the sense electrodes 140 on the base layer 132 may function as sense electrodes for a touch sensor controller, while the drive electrodes 146 of the top PCB layer 136 may function as drive electrodes for a touch sensor controller.

However, in the alternative of a third embodiment of the invention, the functions of the base layer 132 and the top layer 136 may be reversed. Thus, the sense electrodes 140 of the base layer 132 may function as drive electrodes and the drive electrodes 146 of the top layer 136 may function as sense electrodes. However, the third embodiment may be preferable in order to shield the sense electrodes from stray signals from outside the system.

Figure 14:
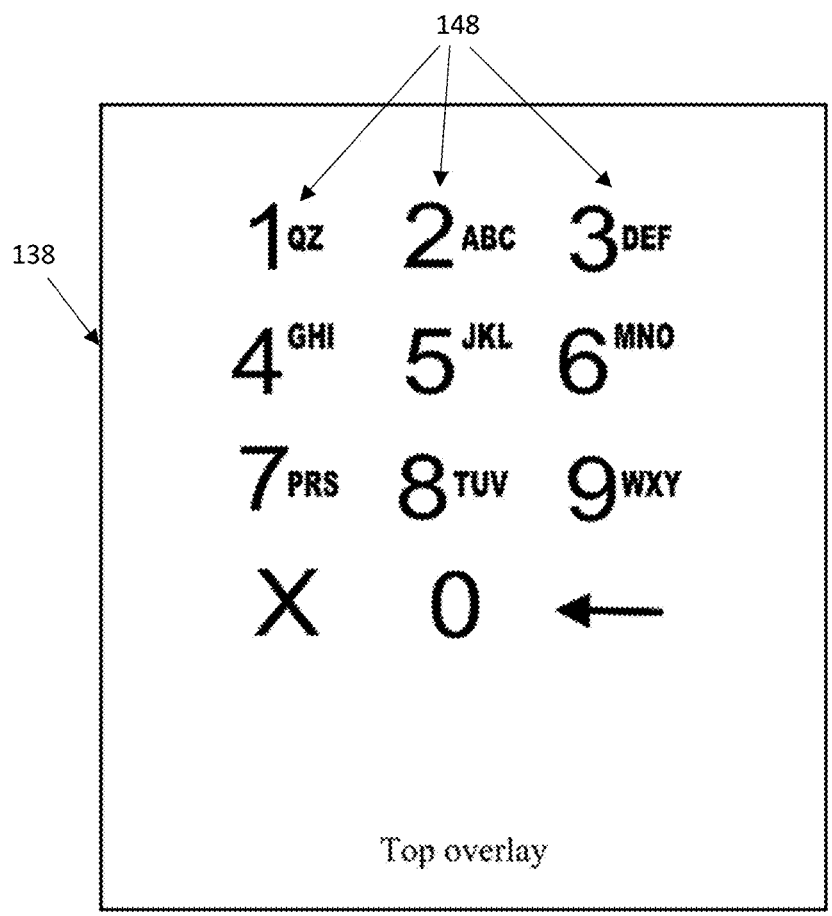
FIG. 14 is a top view of an overlay of the first embodiment of the invention.

FIG. 14 is a top view of the overlay 138. The overlay 38 may be disposed on the top layer 136 to provide a visual guide to the locations and functions of the switches in the system by disposing buttons 148 on the overlay. The buttons 148 may be disposed over and aligned with the apertures 144 in the thin spacer board layer 134, and thus also be aligned with the intersections of the sense electrodes 140 in the base layer 132 and the electrodes 136 in the top layer 136. The buttons 148 are not mechanical buttons but serve only as a guide to where the user should press on the overlay 138.

It should also be understood that the overlay may be blank when it is disposed inside the door handle and away from the view of the user.

The overlay 138 may be comprised of materials such as polycarbonate, glass or any other material that may protect the top layer 136 from harsh environmental conditions, but still allow the top layer 136 to flex as a button 148 is being pressed. Thus, the overlay 148 should also be a flexible material that does not interfere with movement of the top layer 136.

Regarding more specific measurements that may be performed using the embodiments of the present invention, two different measurement types may be performed. The first type of measurement may be for sensing a change in space between the top layer 36 and the base layer 132 as a result of a user pressing on the overlay 138. One sequence of events may be to sequentially energize each of the drive electrodes 146 in the top layer 136. A touch sensor controller coupled to the sense electrodes 140 of the base layer 132 may then process a signal to determine which of the buttons 148 on the overlay 138 are being depressed by a user.

Figure 15:
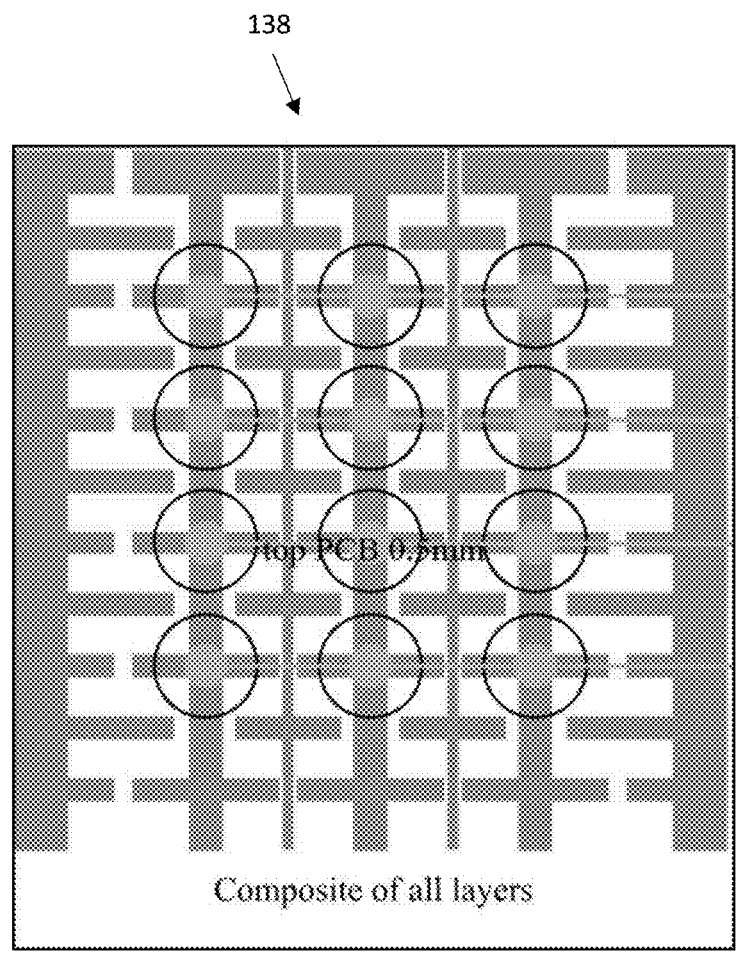
FIG. 15 is a top view of all of the layers shown in FIGS. 5 through 9 of the first embodiment of the invention.

FIG. 15 is a top view of all of the layers shown in FIGS. 10 through 14 of the third embodiment of the invention.

FIG. 16 is provided as a schematic block diagram that illustrates the aspect of the embodiments of the invention that a touch sensor controller 150 is coupled to the sense electrodes 140 of the base layer 132 and the drive electrodes 146 of the top layer 136. The touch sensor controller may generate drive signals and may receive sense signals and determine a change in capacitance. The touch sensor controller 150 may send either type of signal to any of the base layer 132 sense electrodes 140 and the top layer 136 drive electrodes 146. The touch sensor controller 150 may also send drive signals and receive sense signals to dedicated skimmer detection electrodes on the top layer 136.

In summary, at least one of the embodiments of the invention is directed to a system for providing a touch sensor that includes water protection and enables a user wearing non-conductive materials to operate it. The touch sensor system may be comprised of a base layer comprised of a planar substrate and a plurality of parallel sense electrodes disposed thereon, a planar spacer board layer disposed on top of and sealed to the base layer, and wherein the spacer board layer includes a plurality of apertures through the spacer board layer, and a top layer disposed on top of and sealed to the spacer board layer and comprised of a planar substrate, wherein the top layer includes a plurality of parallel drive electrodes that are co-planar but perpendicular to a direction of the sense electrodes.

The system may also include an overlay disposed on top of the top layer, wherein the top layer includes a display showing a plurality of buttons.

Intersections of the sense electrodes and the drive electrodes form switches, wherein each of the plurality of apertures in the spacer board layer and each of the buttons on the overlay are disposed at each of the intersections that a button is desired.

A deflection of the top layer over any of the plurality of apertures that is over an intersection will result in a detectable change in capacitance at the intersection and the identification of a button that is being pressed on the overlay. In addition, the top layer, the spacer board layer and the top layer are sealed to prevent entry of moisture.

In another aspect of the embodiments, pressing on a button on the overlay with a non-conductive object and still causing a detectable change in the associated intersection.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system for providing a door handle proximity sensor that includes water protection, said system comprised of:
   a door handle proximity sensor comprised of:
      a proximity sensor substrate having a first side and a second side;
      a bottom electrode, a middle electrode and a top electrode disposed on the first side of the substrate wherein the bottom, middle and top electrodes are parallel and coplanar on the substrate;
      a shield electrode disposed on the second side of the substrate;
      a proximity controller for generating drive signals and for receiving signals from electrodes that function as sense electrodes; and
      a door handle that functions as a housing for the door handle proximity sensor, wherein the first side of the proximity sensor substrate is facing a vehicle door, and the second side of the proximity sensor substrate is arranged to face in a direction opposite to the vehicle door relative to the proximity sensor substrate,
   wherein the system has a plurality of modes of operations including a mode of operation to:
      send the drive signal to he shield electrode:
      detect the drive signal at the middle electrode; and
      create an effect of floating at the top and bottom electrodes.

2. A method for providing a door handle proximity sensor drat includes water protection, said method comprising:
   providing a door handle proximity sensor comprised of:
   a proximity sensor substrate having an electrode side;
   a first layer comprised of two different electrodes, the first electrode being at least one bottom layer electrode for providing a drive signal, and the second electrode being at least one carbon electrode and not in contact with the at least one bottom layer electrode;
   a second layer comprised of a third electrode being at least one top layer electrode, wherein the first layer and the second layer are parallel and coplanar on the proximity sensor substrate;
   a proximity controller for generating drive signals that are transmitted to the first electrode and for receiving signals from the second electrode, and for generating a ground or a positive signal to the third electrode, and a door handle that functions as a housing for the door handle proximity sensor;
   generating a positive signal on the first electrode;
   generating a ground or a positive signal on the third electrode; and
   taking a single measurement of the second electrode to determine if an object being detected is water or a hand, using the first electrode as a drive electrode;
   using the second electrode as a sense electrode; and using the third electrode as a shield,
   wherein the method further comprises
   switching between a self-capacitance mode of operation arrd a itrtrtual capacitance mode of operation;
   detecting a position of the object in the self-capacitance mode of operation; and
   detecting the rain and the hand in the mutual capacitance mode of operation.

3. The method as defined in claim 2 wherein the method further comprises the step of taking a mutual capacitance measurement as the single measurement to determine if the object being detected is water or a hand.

4. The method as defined in claim 2 wherein the method further comprises the step of taking a self-capacitance measurement as the single measurement to determine a location of the object being detected along a length of the second electrode.

5. The method as defined in claim 3 wherein the method further comprises designating a decrease in mutual capacitance as detection of a hand.

6. The method as defined in claim 3 wherein the method further comprises designating an increase in mutual capacitance as detection of water.

7. The method as defined in claim 3 wherein the method further comprises using the proximity controller in the charge domain.

8. The method as defined in claim 3 wherein the method further comprises using the proximity controller to measure an amount of charge that must be injected onto into the second electrode in order to restore a voltage on the sense electrodes.

9. The method as defined in claim 3 wherein the method further comprises integrating the amount of charge in order to determine a position of the detected object.

10. A system for providing a door handle proximity sensor that includes water protection, said system comprised of:
    a door handle proximity sensor comprised of:
       a proximity sensor substrate having a first side and a second side: a bottom electrode, a middle electrode and a top electrode disposed on the first side of the substrate, wherein the bottom, middle and top electrodes are parallel and coplanar on the subsrate;
       a shield electrode disposed on the second side of the substrate;
       a proximity controller for generating drive signals and for
    receiving signals from electrodes that function as sense electrodes; and a door handle that functions as a housing for the door handle proximity sensor, wherein the first side of the proximity sensor substrate is Pacing a vehicle door and the second side of the proximity sensor substrate is arranged to face in a direction opposite to the vehicle door relative to the proximity sensor substrate, wherein the door handle proximity sensor further comprises a top layer includes an overlaying layer that indirectly affects the capacitance of the electrodes by causing a slight deflection on the top layer in response to a pressing force applied to the top layer causes, wherein the slight deflection of the top layer is into a plurality of apertures in a spacer board layer.

11. The method as defined in claim 2, wherein the top layer includes an overlaying layer that indirectly affects the capacitance of the electrodes by causing a slight deflection on the top layer in response to a pressing force applied to the top layer causes.

* * * * *